United States Patent
Oohchida et al.

(10) Patent No.: US 6,845,077 B2
(45) Date of Patent: Jan. 18, 2005

(54) OPTICAL PICK-UP DEVICE WITH CONVERGENT LIGHT DIFFRACTION FOR RECORDING/READING INFORMATION ON OPTICAL RECORDING MEDIUM

(75) Inventors: Shigeru Oohchida, Tokyo-to (JP); Hiroshi Akiyama, Tokyo (JP); Masahiko Nakayama, Kanagawa (JP)

(73) Assignee: Ricoh Company, Ltd., Yokohama (JP)

( * ) Notice: Subject to any disclaimer, the term of this patent is extended or adjusted under 35 U.S.C. 154(b) by 0 days.

(21) Appl. No.: 10/438,920

(22) Filed: May 16, 2003

(65) Prior Publication Data

US 2003/0193876 A1 Oct. 16, 2003

Related U.S. Application Data

(62) Division of application No. 09/344,120, filed on Jun. 24, 1999, now Pat. No. 6,584,060.

(30) Foreign Application Priority Data

Jun. 24, 1998 (JP) ............................................ 10-176959
Jul. 3, 1998 (JP) ............................................ 10-189171
Jul. 14, 1998 (JP) ............................................ 10-199176

(51) Int. Cl.[7] ............................................... G11B 7/135
(52) U.S. Cl. ............................. 369/112.09; 369/112.14; 369/112.28
(58) Field of Search ...................... 369/112.03, 112.05, 369/112.09, 112.14, 112.28

(56) References Cited

U.S. PATENT DOCUMENTS

| | | | |
|---|---|---|---|
| 4,733,065 A | 3/1988 | Hoshi et al. | |
| 4,823,335 A | 4/1989 | Shikama et al. | |
| 5,172,368 A | 12/1992 | Lehureau | |
| 5,477,386 A | 12/1995 | Okuda et al. | |
| 5,541,906 A | 7/1996 | Kobayashi | |
| 5,608,708 A | 3/1997 | Ophey | |
| 5,621,716 A | 4/1997 | Kojima et al. | |
| 5,627,806 A | 5/1997 | Kobayashi | |
| 5,694,385 A | 12/1997 | Takahashi et al. | |
| 5,712,841 A | 1/1998 | Opheij et al. | |
| 5,923,636 A | 7/1999 | Haruguchi et al. | |
| 6,278,681 B1 | 8/2001 | Nagano | |
| 6,584,060 B1 * | 6/2003 | Oohchida et al. | 369/112.05 |

FOREIGN PATENT DOCUMENTS

JP 3-225636 10/1991

* cited by examiner

*Primary Examiner*—W. R. Young
(74) *Attorney, Agent, or Firm*—Dickstein Shapiro Morin & Oshinsky LLP

(57) ABSTRACT

An optical pick-up device for recording/reading an optical recording medium is provided, which can efficiently utilize light emitted from the laser light source. The optical pick-up device includes a light source, an optical system, a quarter-wave plate, a diffraction component, and a photodetector unit. The photodetector unit may further include a transmitting portion for transmitting the light beam emitted from the light source, and may be disposed opposite the light source in a vicinity of the light source so that light emitted from the light source is transmitted through the transmitting portion. The transmitting portion may be an aperture provided in the photodetector unit. Alternatively, the optical pick-up device may further include an optical path separator for separating the diffracted returning light beam from the light beam that passes from the light source to the diffraction component.

24 Claims, 13 Drawing Sheets

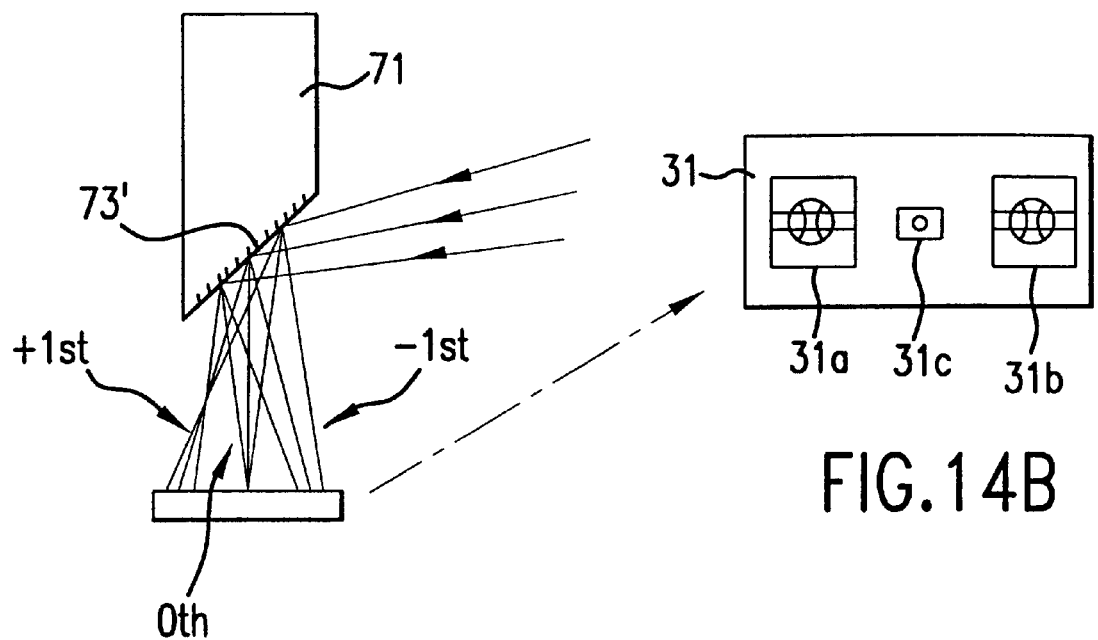
FIG.14A
FIG.14B
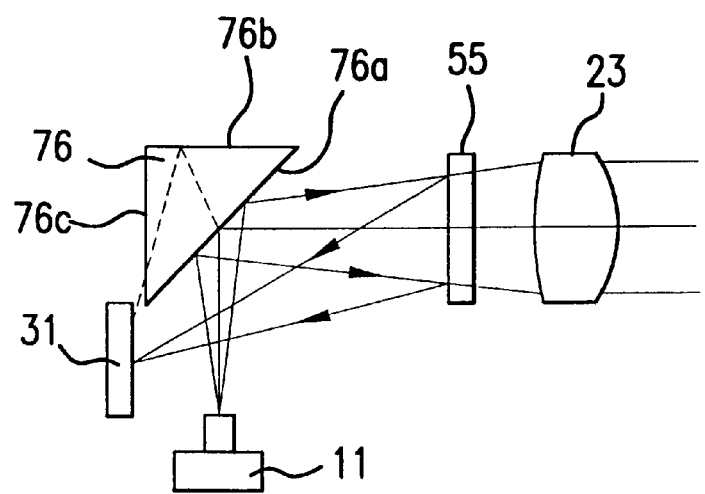
FIG.15

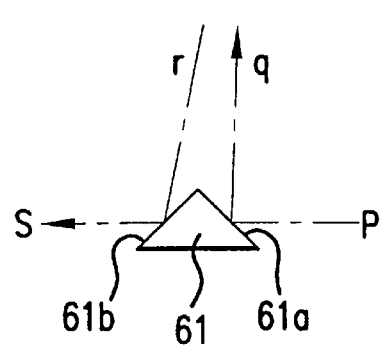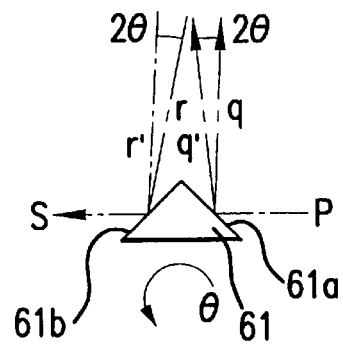
FIG.18A  FIG.18B
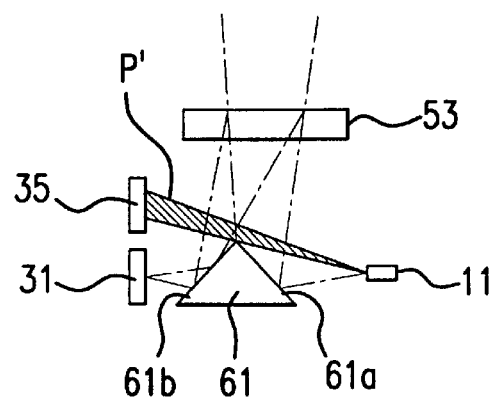
FIG.19
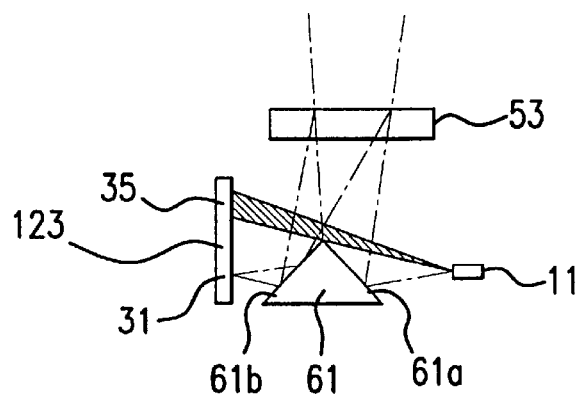
FIG.20

OPTICAL PICK-UP DEVICE WITH CONVERGENT LIGHT DIFFRACTION FOR RECORDING/READING INFORMATION ON OPTICAL RECORDING MEDIUM

This application is a divisional of U.S. patent application No. 09/344,120, filed Jun. 24, 1999, which issued as U.S. Pat. No. 6,584,060 on Jun. 24, 2003.

BACKGROUND OF THE INVENTION

1. Field of the Invention

This invention relates to an optical pick-up device having a diffraction component for recording/reading information on an optical recording medium such as an optical disk, an optical card, or an optical tape.

2. Description of Related Art

In the field of an optical pick-up device for recording/reading information on an optical recording medium such as a Compact Disk (CD), demands for simplification of structure, assembly, or adjustment, and demands for reduction of costs have been increasing in recent years.

FIG. 21 illustrates a background optical pick-up device which employs a holographic diffraction component. The optical pick-up device includes a semiconductor laser light source 511 for emitting laser light having a wavelength of 780 nm, a photodetector unit 531, the holographic diffraction component 553, a mirror 565, a reflective surface 566, a diffraction grating 541 for generating 3-division light beams, and an objective lens 521. The laser light source 511, the photodetector unit 531, and the holographic diffraction component 553 are integrated in a body tube, and are optically adjusted to form a block.

A light beam emitted from the laser light source 511 is transmitted through the diffraction grating 541 for generating 3-division light beams and the holographic diffraction component 553, is reflected by the mirror 565 for bending the optical path, is transmitted by the objective lens 521, converges on a recording pit-surface of an optical disk 101, and is reflected by the recording pit-surface.

The returning light beam thus reflected by the recording pit-surface is transmitted through the objective lens 521, is reflected by the mirror 565, and is incident onto the holographic diffraction component 553, where two kinds of +1st order diffracted returning light are generated by a holographic surface 554 having two different holographic patterns with different pitches. These two kinds of beams are incident on the reflective surface 566 at an angle equal to or more than a critical angle, are thereby reflected by the total internal reflection, are transmitted through the transmitting surface after the total internal reflection, and arrive in the photodetector unit 531. Thereby, information signals, focusing-error signals, and tracking-error signals are detected.

According to the background optical pick-up device as shown in FIG. 21, the laser light source or the photodetector is capable of being substituted to another one having a different specification. Therefore, modification by substitution of the component to another type of high-speed photodetector or by adoption of a new type of semiconductor laser light source can be easily achieved. Further, initial investments are not expensive for manufacturing products according to this embodiment.

Another background optical pick-up device is disclosed in the Japanese Laid-Open Patent Publication No. 3-225636, which employs a birefringent diffraction component having a birefringent crystal for achieving high efficiency of light-utilization. FIG. 22 illustrates the background optical pick-up device which includes a semiconductor laser light source 511 as a light source, a birefringent diffraction grating 541 for separating a light beam 502 emitted from the semiconductor laser light source 511 into three beams, a collimator lens 523 and an objective lens 521, a birefringent holographic diffraction component 555, a quarter-wave plate 625, a 6-division photodetector unit 532 for detecting the diffracted returning light beam out of the optical axis, and a photodetector 533.

The collimator lens 523 and an objective lens 521 are used for an imaging optical system. The light beam from the diffraction grating 541 is collimated into parallel light beam and converges on an optical disk 101 through the imaging optical system. The birefringent holographic diffraction component 555 diffracts and separates the returning light reflected by the optical disk 101 out of the optical axis of the imaging system. The quarter-wave plate 625 is disposed between the optical disk 101 and the diffraction grating 541 or between the optical disk 101 and the birefringent holographic diffraction component 555.

In this optical pick-up device, the birefringent holographic diffraction component is used for simplifying the structure. Further, a uniaxial structure of this optical pick-up device achieves miniaturization thereof and reduction in weight. In addition, reproduction of signals of the optical disk at high efficiency is achieved, when the birefringent holographic diffraction component and the birefringent diffraction grating are employed.

As described above, by combining the semiconductor laser light source, the photodetector, and the holographic diffraction component, an optical pick-up device-is provided having features accompanied by a miniaturized structure, a reduced weight, and a simplified method for adjustment. However, in the background optical pick-up device for recording/reading, there still remain problems as follows.

(1) High efficiency in utilizing light is desired for recording information on an optical recording medium. In an optical pick-up device for reading information on an optical recording medium such as a Compact Disc (CD), which is normally used for reproduction only, there are few problems regarding efficiency in utilizing light. In this case, the focal length of the collimator lens may be long.

In contrast, in the optical pick-up device for recording a re-writable or write-once optical recording medium such as a Compact Disc ReWritable (CD-RW), a Compact Disc Recordable (CD-R), a Digital Video Disc Recordable (DVD-R), or a Digital Video Disc ReWritable (DVD-RW), a collimator lens having a large numerical aperture and a short focal length is frequently used for collecting light from the semiconductor laser light source with little loss, in order to secure a high power of light on the surface of the optical disk.

However, when such a collimator lens having a short focal length is used, a space for disposing a mirror for reflecting the diffracted returning light, etc., becomes narrow. Therefore, the mirror is required to be miniaturized. In this case, mass-productivity is deteriorated due to difficulties in assembling such a miniaturized component accurately.

(2) A large separation angle is required. As described above, in achieving an optical pick-up device capable of recording, the collimator lens having a large numerical aperture and a short focal length, for example, a numerical aperture of 0.3 and a focal length of 10 mm, is frequently used. In this case, for securing a package interval between a laser diode package and a photodetector package within such a short distance, a large diffraction angle of the diffraction grating should preferably be employed, from this point of view.

For achieving the large diffraction angle of the diffraction grating, a diffraction grating having a short pitch should be employed. In this case, however, due to restrictions in fabricating a grating having such a short pitch, it is difficult to form an ideal grating structure having the short pitch.

As a result, a separation property for the polarized light or diffraction efficiency is generally deteriorated, and a SIN ratio of signals is reduced. With this context, there have been limitations in employing a diffraction grating having a reduced pitch, or large diffraction angle, in the background optical pick-up device.

(3) Divergent transmitted light is imposed on aberration due to anisotropy of substrate crystal. When the birefringent crystal substrate such as a thin lithium niobate substrate is disposed in a divergent optical path, because the refractive index depends on a propagation direction of the light, the transmitted light is imposed on aberration.

Therefore, when the birefringent crystal is disposed between the laser diode light source and the collimator lens, it is preferred that the aberration should be suppressed by disposing an additional optical member for suppressing the aberration. However, in this case, the manufacturing cost increases. Further, mass-productivity is deteriorated, because the thin crystal substrate is not easily processed.

FIG. 23A illustrates yet another background optical pick-up device for recording/reading information on a recording surface of an optical recording medium. The background optical pick-up device is explained with reference to FIGS. 23A–23C.

In FIG. 23A, a divergent light beam emitted from a light-emitting portion 513 of the semiconductor laser light source 511 as a light source is transmitted through the diffraction grating 551, and is incident onto the collimator lens 523 which collimates the light beam into a parallel light beam. Subsequently, the light beam is reflected by an upward-reflection mirror 563, is transmitted by a quarter-wave plate 625, begins to converge when it is transmitted through an objective lens 521, and converges as a light spot on a recording surface 103 of an optical recording medium 101 such as a Compact Disc, etc.

The returning light beam, which is reflected by the recording surface 103, is transmitted by the objective lens 521 and the quarter-wave plate 625, is reflected by the upward-reflection mirror 563, begins to converges when it is transmitted through the collimator lens 523, and is transmitted by the diffraction grating 551.

The diffraction grating 551 is a birefringent holographic diffraction component for diffracting the returning light beam, which has a power of diffraction dependent on the polarization of the light. A plane of polarization of the returning light beam after transmitted by the quarter-wave plate 625 twice, or forth and back, is rotated by 90 degrees from the initial state as emitted from the light source. The birefringent holographic diffraction grating 551 is constructed so as not to diffract the light beam from the light source but to diffract the returning light beam. By this diffraction, the returning light beam is separated from the optical path between the light source and the diffraction grating 551. Then, the diffracted returning light beam is reflected by a mirror 565, to be incident on the photodetector unit 531.

The photodetector unit 531 generates focusing-error signals and tracking-error signals on the bases of the detection of the returning light beam, and also generates reproduction signals for reproducing information. Further, by controlling an actuator (not shown) of a servo-system on the basis of the thus generated focusing-error signals and the tracking-error signals, focusing/tracking operation is performed.

As described above, the optical pick-up device which records or reproduces information of an optical recording medium requires a large power of light beam when recording information. Therefore, the efficiency of light utilization from the light source is focused on for an optical pick-up device having such a structure as shown in FIG. 23A.

FIG. 23B illustrates a collimator lens 523 having a long focal length. When the focal length of the collimator lens 523 is long, even if the separation angle t for separating the returning light beam is relatively small, there are few problems in the layout of the mirror 565 or the photodetector unit 531. However, because the emitted light beam from the semiconductor laser light source 511 is a divergent light beam, not a little portion of the emitted light beam is not collected by the collimator lens 523, and the efficiency of light utilization of the pick-up device generally remains in a low level. Therefore, it becomes difficult to perform operation for writing information at a high rate.

When numerical aperture of the collimator lens 523 is increased for utilizing light efficiently, in the optical pick-up device equipped with a collimator lens 523 having a long focal length, the diameter of the collimator lens 523 is also increased, the dimension of the optical pick-up device itself is therefore undesirably enlarged.

FIG. 23C illustrates a collimator lens 523 having a short focal length and a large numerical aperture. In this case, an amount of the light beam collected by the collimator lens 523 is increased, in principle. However, a mirror 565 which reflects the returning light beam toward the photodetector unit 531 is required to be disposed in a position so as not to shield the divergent light beam emitted from a light-emitting portion 513. Therefore, a separation angle $\zeta$ should be set considerably larger than the separation angle $\xi$ of FIG. 23B.

In order to increase the separation angle of the birefringent holographic diffraction component as a diffraction grating, a pitch of the grating has to be reduced. This requires, however, adoption of a high-level micro fabrication process, which in turn increases production costs, and by which mass-productivity is deteriorated.

If a diffraction grating having a small pitch, which is produced by a fabrication method without sufficient fabrication accuracy, is employed, then poor quality in transparency or diffraction efficiency may reduce power of the light projected on the optical recording medium or the returning light beam. In this case, a problem may arise, for example, a S/N ratio of the signals generated by the photodetector may be reduced.

Further, in an optical pick-up device which employs a birefringent crystal such as a lithium niobate crystal, a transmitted light beam, as far as it is divergent, is imposed on aberration, because refractive index of the birefringent crystal is dependent on propagation directions of the light. The aberration may be compensated using a compensation optical component, but this further increases costs. In addition, the scale of the optical pick-up device becomes large.

FIG. 24 illustrates still another background optical pick-up device, in which a holographic diffraction component is employed. A laser light beam, which is emitted from a semiconductor laser light source 511, converges on an optical information recording medium such as an optical disk 101, through a holographic diffraction component 553 and an objective lens 523. Then, the returning light beam through the objective lens 523 is diffracted by the holographic diffraction component 553; thereby the returning light beam reflected by the optical disk 101 is separated from the light emitted from the semiconductor laser 511.

A photodetector 531 detects the returning light beam which is diffracted by the holographic diffraction component 553. Information recorded in the optical disk 101 is reproduced on the basis of signals which are obtained through detection of the returning light beam by the photodetector 531.

Due to restrictions in manufacturing a holographic diffraction component having a short pitch of grating, the background optical pick-up devices frequently employ a holographic diffraction component having a small angle of diffraction. As a result, the semiconductor laser 511 and the photodetector 531 are arranged with a very close distance, for example, in a range of 1–2 mm.

In this case, the following shortcomings may arise. First, noise may be superimposed on signals of the photodetector 531, when the semiconductor laser 511 is driven with a high-frequency modulation. This is typical in a photodetectors having a detection circuit therein, and may deteriorate marginal detection of signals. Second, an optical pick-up device is normally equipped with an optical unit which is packed with semiconductor laser 511, holographic diffraction component 553, and a photodetector unit 531. In this case, modification of one unit by substitution of the unit, especially semiconductor laser 511, may not be easy. Therefore, degree of freedom in designing is relatively low in such an optical pick-up device.

SUMMARY OF THE INVENTION

Accordingly, the present invention has been made in view of the above-discussed problems and an object of the present invention is to address these and other problems.

Another object of the present invention is to provide a novel optical pick-up device capable of recording an optical recording medium at high efficiency in light utilization.

According to an embodiment disclosed herein, a novel optical pick-up device for recording/reading information on an optical recording medium is provided, which includes a light source for emitting a light beam, an optical system having a converging function for the light beam, a diffraction component, and a photodetector unit.

The light beam emitted from the light source converges on a recording surface of the optical recording medium through the optical system, and the returning light beam that is reflected by the recording surface is collected and converges through the optical system. The returning light beam is diffracted by the diffraction component, and reaches the photodetector unit for detecting the diffracted light beam. The photodetector unit includes a detector for detecting the diffracted returning light beam.

In another embodiment, the optical pick-up device may further include a quarter-wave plate. The quarter-wave plate is disposed in a position so as to transmit the light beam and the returning light beam. A birefringent holographic diffraction grating is used in the diffraction component of this embodiment.

In yet another embodiment, the optical pick-up device may further include a monitoring detector for monitoring a power of the light beam emitted from the light source.

In still another embodiment, the photodetector unit further includes a transmitting portion for transmitting the light beam emitted from the light source. The photodetector unit having the transmitting portion is disposed opposite the light source in a vicinity of the light source so that the light beam emitted from the light source is transmitted through the transmitting portion. The transmitting portion may be an aperture provided in the photodetector unit.

In still another embodiment, the optical pick-up device further include an optical path separator for separating the diffracted returning light beam from the light beam that is emitted from the light source toward the optical path separator. The optical path separator includes a transparent body having a surface having a reflective region and a transmitting region.

The reflective region may reflect the light beam from the light source. Alternatively, the reflective region may reflect the diffracted returning light beam diffracted by the diffraction component.

The transparent body may include a prism or a pair of prisms. Total internal reflection of the prism may be utilized in the reflective region.

Alternatively, the transparent body may be a transparent flat plate which is disposed obliquely to an optical path of the returning light beam. The optical pick-up device may detect tracking-error signals using an astigmatism focusing-error detecting method which utilizes astigmatism due to the flat plate.

In still another embodiment, the optical pick-up device further includes an optical member having a prism-like transparent body which is disposed in an optical path between the diffraction component and the light source.

The optical member may include a reflective optical surface thereon, which reflects the diffracted returning light beam toward the photodetector unit. The light beam emitted from the light source may be provided to the diffraction component through the optical member.

Alternatively, the optical member may include a first optical surface and a second optical surface formed on the optical member. The first optical surface reflects but partly transmits the light beam emitted from the light source. The second optical surface reflects the diffracted returning light beam toward the photodetector unit, and transmits the light beam that is transmitted through the first optical surface. The light beam that is transmitted through the second optical surface may be provided to the monitoring detector.

Yet alternatively, the optical member may include the first optical surface and a total internal reflection surface which reflects the light beam transmitted trough the first optical surface. The light beam that is reflected by the total internal reflection surface may be provided to the monitoring detector.

In still another embodiment, the optical pick-up device further includes a reflective member having a first reflective surface for reflecting the light beam emitted from the light source toward the holographic diffraction component and a second reflective surface for reflecting the diffracted returning light beam toward the photodetector unit.

In other embodiments, the detector and the monitoring detector may be integrated. Further, the optical pickup device may include a reflective diffraction grating, which reflects a portion of the light beam emitted from the light source toward the monitoring detector.

In other embodiments, the diffraction component may include a blazed grating.

In other embodiments, the diffraction component may include an inorganic anisotropic optical film that is formed using an oblique deposition method. Alternatively, the diffraction component may include an organic anisotropic optical film that is formed by orienting an organic material.

In other embodiments, the light source, the diffraction component, and the photodetector unit may be housed in a chassis.

In other embodiments, the diffraction component may further include an additional holographic converging function as a positive lens.

BRIEF DESCRIPTION OF THE DRAWING

A more complete appreciation of the present invention and many of the attendant advantages thereof will be readily obtained as the same becomes better understood by reference to the following detailed description when considered in connection with the accompanying drawings, wherein:

FIG. 14A illustrates a portion of an optical pick-up device according to still another embodiment of the present invention;

FIG. 14B illustrates a photodetector of FIG. 14A;

FIG. 15 illustrates a portion of an optical pick-up device according to still embodiment of the present invention;

FIGS. 18A and 18B are schematic views for the portion of the optical pickup device of FIG. 17, illustrating directions of light propagation with and without rotational displacement of the reflective member, respectively;

FIG. 19 illustrates a portion of an optical pick-up device according to still another embodiment of the present invention;

FIG. 20 illustrates a portion of an optical pick-up device according to still another embodiment of the present invention;

DESCRIPTION OF PREFERRED EMBODIMENTS

Figure 1A:
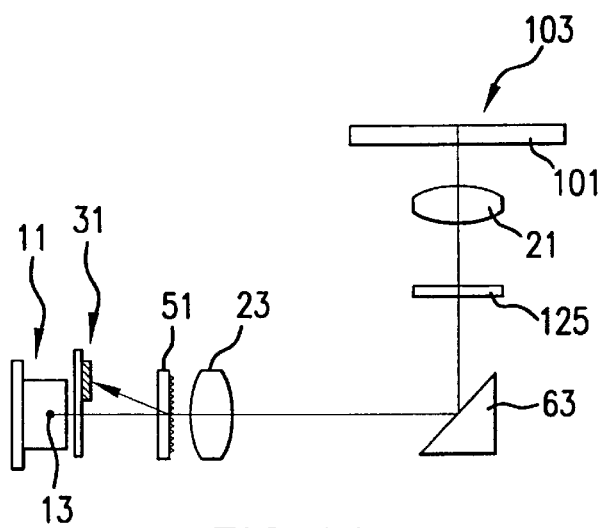
FIG. 1A illustrates an optical pick-up device according to an embodiment of the present invention.

Referring now to the drawings, wherein like reference numerals designate identical or corresponding parts throughout the several views, preferred embodiments of the present invention are now described.

FIG. 1A illustrates an optical pick-up device for recording/reading information on a recording surface of an optical recording medium according to an embodiment of the present invention. The optical pick-up device includes a semiconductor laser light source 11, a diffraction component 51, a collimator lens 23, an upward-reflection mirror 63, a quarter-wave plate 125, an objective lens 21, and a photodetector unit 31. The semiconductor laser light source 11 emits a light beam in a polarized state.

The optical pick-up device, as shown in FIG. 1A, records information on an optical recording medium 101 by irradiating a recording surface of the optical recording medium with a light beam from the semiconductor laser light source 11 through the diffraction component 51, and reads information by irradiating the photodetector unit 31 with a diffracted returning light beam through the diffraction component 51. The collimator lens 23 and the objective lens 21 are used to form an optical system, through which the light beam converges on the recording surface of the optical recording medium, and through which the returning light beam that is reflected by the recording surface is collected and converges. The optical pick-up device is further explained with reference to FIGS. 1A–1E.

A diffraction power of the holographic diffraction component 51 for polarized light is dependent on a polarized state of light. In this embodiment, the diffraction component 51 is constructed so as to diffract only the returning light beam.

Figures 1B, 1C:
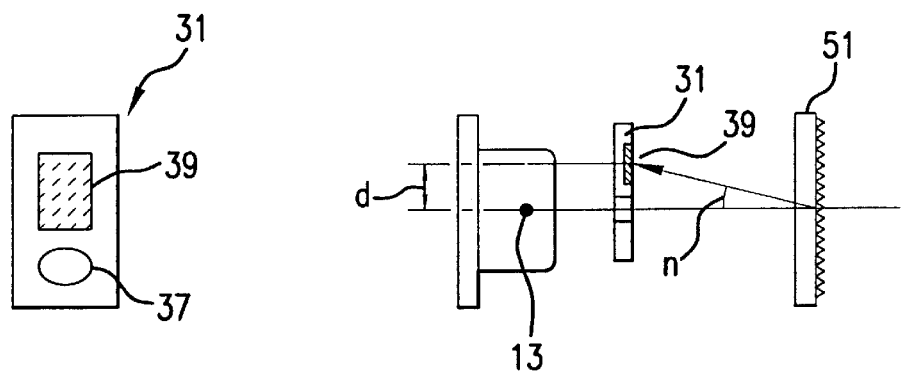
FIG. 1B is a schematic view illustrating the photodetector unit of FIG. 1A.
FIG. 1C is a schematic view illustrating a separation angle η of the diffraction component and a distance d between the photodetector unit and the semiconductor laser light source of FIG. 1A.

The photodetector unit 31 includes a light transmitting portion 37 and a detector 39 for detecting the diffracted returning light beam, as shown in FIG. 1B. In addition, the photodetector unit 31 is disposed in a vicinity of the semiconductor laser light source 11 so that the light transmitting portion 37 is disposed opposite a light-emitting portion 13 of the semiconductor laser light source 11.

The collimator lens 23 collimates the diverging light beam emitted from the semiconductor laser light source 11. The optical pick-up device according to this embodiment is capable of recording information on an optical recording medium. Accordingly, the collimator lens 23 is designed to have optical properties such that the light beam from the light source can be utilized efficiently. For example, a collimator lens having a focal length of 10 mm and a numerical aperture of 0.3 may be employed in this embodiment.

The photodetector unit 31 may have a substrate. The light transmitting portion 37 may be a hole provided in the substrate of the photodetector unit 31. In this case, the substrate need not be transparent. Alternatively, the light transmitting portion 37 may be made of a transparent material.

In this embodiment, the light transmitting portion 37 is formed, for example, as an aperture which is provided to have an ellipsoid outline that fits on with that of the divergent light beam emitted by the semiconductor laser light source 11, where the light transmitting portion 37 has a major axis having a length of, for example, 0.5 mm, so that the whole light beam emitted from the light-emitting portion 13 can be substantially transmitted through the light transmitting portion 37. In FIG. 1A, although the photodetector unit 31 and the semiconductor laser light source 11 are illustrated separately, the photodetector unit 31 may be disposed on a front surface of a package of the semiconductor laser light source 11 using a bonding agent, etc.

The photodetector unit 31 is placed in a position near the light-emitting portion 13 so that the light transmitting portion 37 is on the extension of the optical axis of the collimator lens 23, where the light-emitting portion 13 is also on the extension of the optical axis of the collimator lens 23. The light beam emitted from the light-emitting portion 13 is transmitted through the light transmitting portion 37 and through the diffraction component 51, where the diffraction component 51 is configured to have no holographic diffraction power for the light beam emitted from the light source to the collimator lens 23. Then, the light beam is collimated by the collimator lens 23, reaches an optical recording medium 101, and is reflected by the optical recording medium 101. The returning light beam that is thus reflected by the optical recording medium 101 passes through the collimator lens 23, and is incident on the diffraction component 51.

Because a plane of polarization of the returning light beam is rotated by 90 degrees from the initial state, the returning light beam is diffracted by the diffraction component 51, and is incident onto the detector 39 of the photodetector unit 31. In FIG. 1A, the detector 39 is illustrated so that the detector 39 is disposed on the surface of the substrate. However, it is more preferable that the detector 39 is formed in a concave portion of the substrate, as illustrate in FIG. 1C.

Figure 1D:
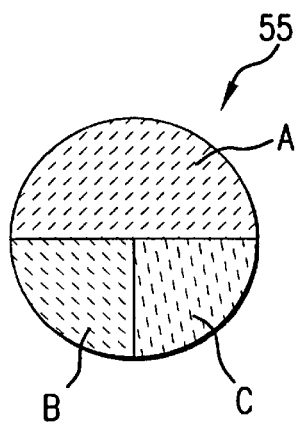
FIG. 1D is a schematic view illustrating the diffraction component of FIG. 1A.

In the embodiment as shown in FIG. 1D, the birefringent holographic grating 55 formed on the diffraction component 51 is composed of, for example, birefringent holographic portions A, B, and C.

Further, the birefringent holographic grating 55 having the birefringent holographic portions A, B, and C may have a refractive function as a positive lens through which the diffracted returning light beam converges on the detector 39, because a distance between the detector 39 and the diffraction component 51, with respect to the optical axis, is smaller than that between the light-emitting portion 13 and the collimator lens 23. In this embodiment, transverse direction, or right and left directions of FIG. 1A corresponds to a tracking direction of the optical pick-up device.

Figure 1E:
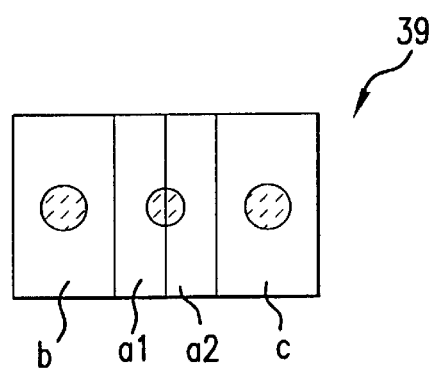
FIG. 1E is a schematic view illustrating a photodetector of FIG. 1A.

The detector 39 includes, as shown in FIG. 1E, 4-division detector portions a1, a2, b, and c. A portion of the returning light beam diffracted by the birefringent holographic portion A converges on a boundary portion between the detector portions a1 and a2, and portions of the returning light beam diffracted by the birefringent holographic portions B and C converge on the detector portions b and c, respectively.

Hereinafter, respective detected signal intensities being output from the detector portions a1, a2, b, and c are expressed as signals $\alpha_1$, $\alpha_2$, $\beta$, and $\gamma$. In this embodiment, focusing-error signals are detected by the knife-edge method, where the knife-edge portion is defined as a boundary portion between the birefringent holographic portions A and B or between A and C. The focusing-error signals are given by ($\alpha_1 - \alpha_2$) signals. If a spot of the light incident on the recording medium 101 is off the track of the recording surface 103, the portion of the returning light beam that is incident on the birefringent holographic portions B and C, varies asymmetrically. Therefore, ($\beta$-$\gamma$) signals may be used for the tracking-error signals. As to the reproduction of information, ($\alpha_1 + \alpha_2 + \beta + \gamma$) signals or a portion thereof may be used as reproduction signals.

Figure 23A:
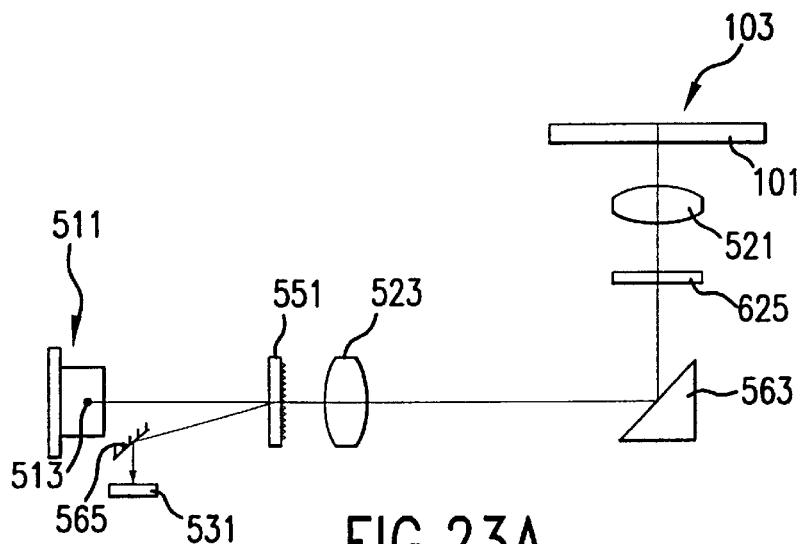
FIG. 23A illustrates yet another background optical pick-up device using a polarized holographic diffraction component.
Figure 23B:
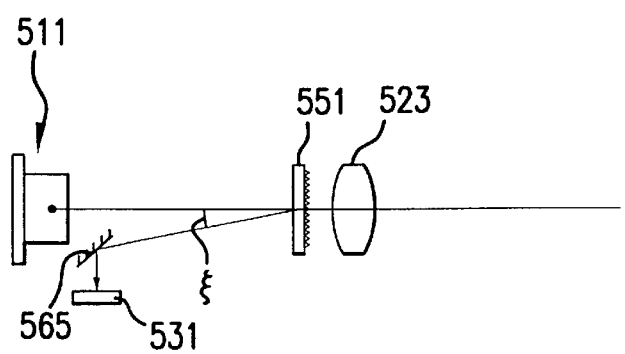
FIG. 23B illustrates a portion of still another optical pick-up device employing a collimator lens having a long focal length.
Figure 23C:
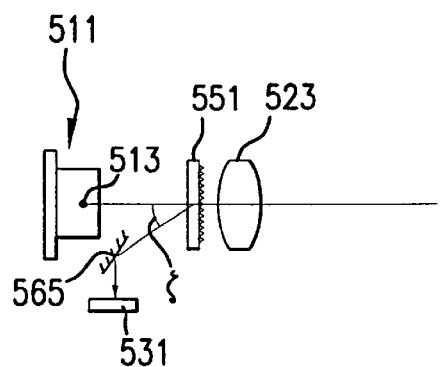
FIG. 23C illustrates a portion of still another optical pick-up device employing a collimator lens having a short focal length.
Figure 24:
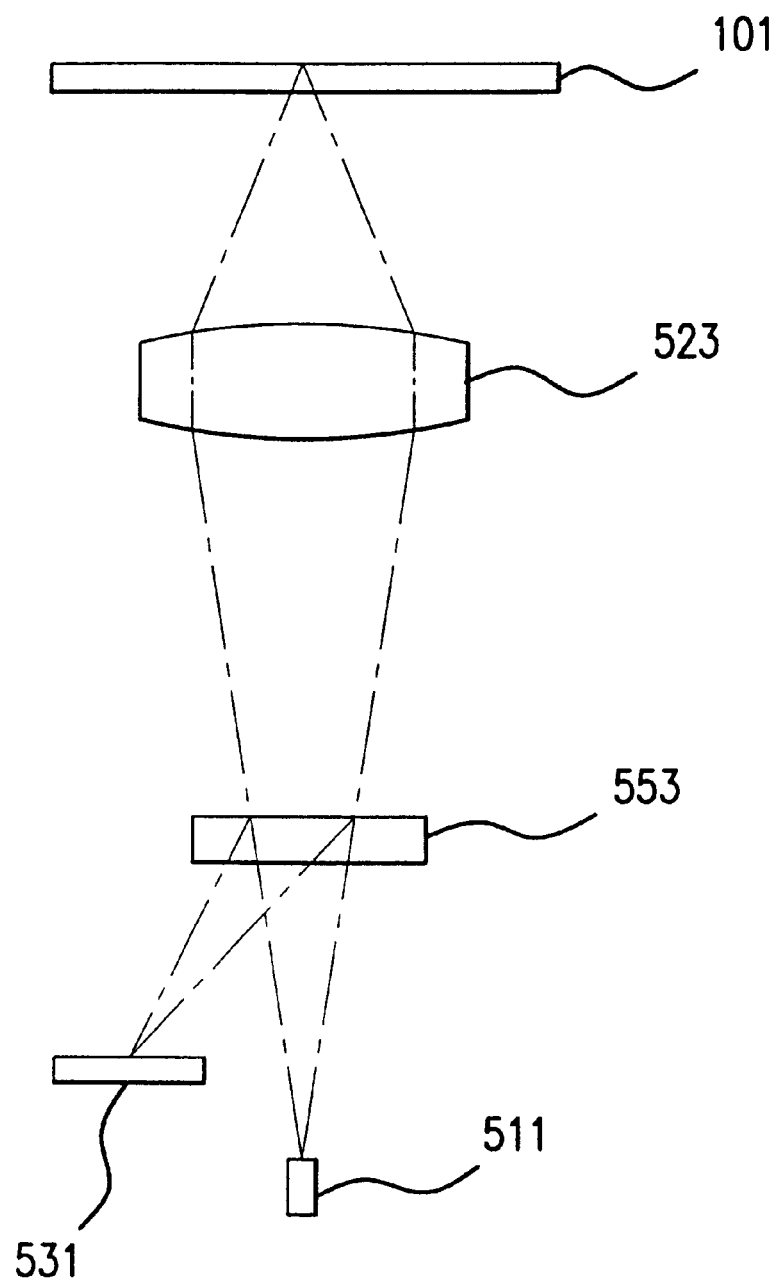
FIG. 24 illustrates still another background optical pick-up device using a holographic diffraction component.

As illustrated in FIG. 1C, an interval d between the light-emitting portion 13 and the detector 39 of the photodetector unit 31 may be as small as, for example, about 1 mm. In such a case, the necessary separation angle $\eta$ of the diffraction component 51 becomes, for example, about 10 degrees at most. Accordingly, a conventional grating may be used for the optical pick-up device according to the present invention, which includes a collimator lens having a large numerical aperture. In this case, the above-mentioned problem does not arise, such as the decrease in an S/N ratio due to the deterioration of separation properties of polarized light, low efficiency in diffraction properties, raised costs, or deterioration of mass-productivity. In addition, because the light transmitting portion and the detector are constructed as an integrated unit, the photodetector unit 31 can be assembled with more ease than the case of the optical pick-up device of FIG. 23, in which position of the mirror 565 relative to the photodetector unit 531 has to be adjusted.

Figure 2A:
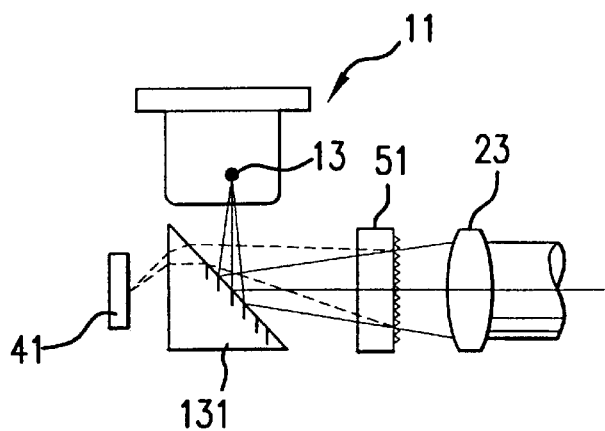
FIG. 2A illustrates a portion of an optical pick-up device according to another embodiment of the present invention.

FIG. 2A illustrates a portion of an optical pick-up device according to another embodiment of the present invention. The optical pick-up device according to this embodiment, includes a semiconductor laser light source 11, a diffraction component 51, a photodetector unit 41 having a detector, a collimator lens 23, an optical path separator 131 for separating an optical path of the returning light beam from that of a light beam emitted from the light source 11. A portion of the optical system between an optical recording medium and the collimator lens 23 is similar to that of the embodiment as illustrated in FIG. 1A. The optical pick-up device, as shown in FIG. 2A, records information on an optical recording medium by irradiating a recording surface of the optical recording medium with a light beam emitted by the semiconductor laser light source 11 through the diffraction component 51, and reads information by irradiating the photodetector unit 41 with a diffracted returning light beam through the diffraction component 51. This embodiment is further detailed with reference to FIGS. 2A and 2B.

A light beam emitted from a light-emitting portion 13 of the semiconductor laser light source 11 is reflected by the optical path separator 131, is transmitted through the diffraction component 51, and is collimated by the collimator lens 23. After that, the light beam passes through the optical path similar to that of the optical pick-up device of FIG. 1A, and is incident on the recording surface of the optical recording medium, in a form of a light spot. The returning light beam which is thus reflected by the recording surface passes in the reverse direction. Then, a plane of polarization of the returning light beam is rotated by 90 degrees from the initial state as emitted by the semiconductor laser light source 11. Further, the returning light beam is transmitted through the collimator lens 23, is diffracted by the diffraction component 51, is transmitted through the optical path separator 131, and is incident onto the photodetector unit 41.

Figure 2B:
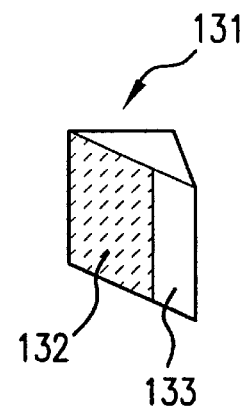
FIG. 2B is a schematic view illustrating the optical path separator of FIG. 2A.

The optical path separator 131 separates optical path of the returning light beam from that of the light beam emitted from the semiconductor laser light source 11 to the diffraction component 51. The optical path separator 131 includes a transparent body, for example, a prism. As illustrated in FIG. 2B, there are a reflective region 132 having a metal film and a transmitting region 133 in an oblique surface of the prism. The light beam emitted from the semiconductor laser light source 11 is reflected by the reflective region 132 toward the diffraction component 51, and the returning light beam diffracted by the diffraction component 51 is incident on the transmitting region 133, is thereby transmitted by the prism, and is finally incident on the photodetector unit 41.

The diffraction component 51 is a birefringent holographic diffraction component having a diffractive function dependent on the polarization of light. As to the birefringent holographic grating formed on the diffraction component 51, a holographic grating similar to that illustrated in FIG. 1D may be used.

The photodetector unit 41 detects the diffracted returning light beam that has been separated from the light beam from the laser light source 11. As to the photodetector unit 41, a detector having a detector surface similar to that illustrated in FIG. 1E may be used. In this embodiment, because the photodetector unit 41 may be disposed in a position where the returning light beam through the collimator lens 23 converges, the birefringent holographic diffraction grating of the diffraction component 51 is not required to have a converging function as a positive lens, in contrast to the embodiment as illustrated in FIG. 1A.

According to the embodiment as illustrated in FIG. 2A, in which the reflective region 132 and the transmitting region 133 are formed on one surface of the optical path separator 131, the separation angle between the light beam and the returning light beam need not be large, because a boundary between the reflective region 132 and the transmitting region 133 can be drawn accurately, in a case, for example, when the reflective region 132 and the transmitting region 133 are formed using a mask with sufficient accuracy. Thereby an optical pick-up device capable of writing information on an optical recording medium is provided without increasing the separation angle of the diffraction grating. As a result, a low-cost mass productive conventional diffraction grating can be used for the writing optical pick-up device.

Further, according to the embodiment as shown in FIG. 2A, the semiconductor laser light source 11 and the photodetector unit 41 may be disposed with a sufficient distance, because the returning light beam is diffracted by the prism along a direction apart from the semiconductor laser light source 11. Thereby the photodetector unit 41 is not easily influenced by heat from the semiconductor laser light source 11.

Figure 3A:
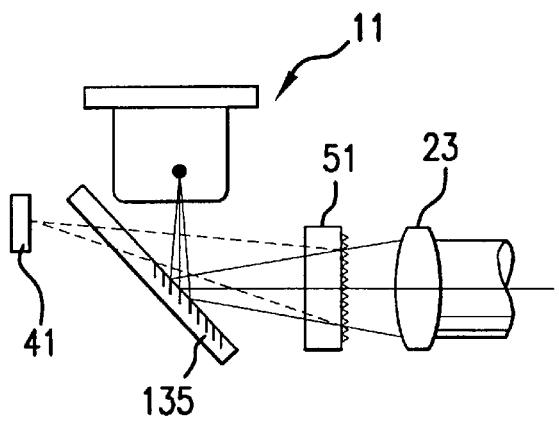
FIG. 3A illustrates a portion of an optical pick-up device according to yet another embodiment of the present invention.

FIG. 3A illustrates a portion of an optical pick-up device according to yet another embodiment of the present invention. The optical pick-up device according to this embodiment, includes a semiconductor laser light source 11, a diffraction component 51, a photodetector unit 41, a collimator lens 23, an optical path separator 135 for separating an optical path of the returning light beam from that of a light beam emitted from the light source 11. A portion of the optical system between an optical recording medium and the collimator lens 23 is similar to that of the embodiment as illustrated in FIG. 1A. This embodiment is detailed with reference to FIGS. 3A–3C.

The optical pick-up device, as shown in FIG. 3A, records information on an optical recording medium by irradiating a recording surface of the optical recording medium with a light beam emitted from the semiconductor laser light source 11 through the diffraction component 51, and reads information by irradiating the photodetector unit 41 with a diffracted returning light beam through the diffraction component 51.

In this embodiment, a birefringent diffraction grating is formed on the diffraction component 51 having a diffractive function dependent on the polarization of transmitted light.

Figure 3B:
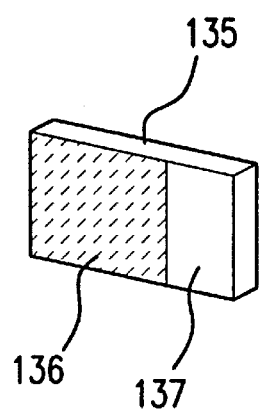
FIG. 3B is a schematic view illustrating the optical path separator of FIG. 3A.

The optical path separator 135 separates the optical path of the diffracted returning light beam from that of the light beam emitted from the semiconductor laser light source 11 to the diffraction component 51. A reflective region 136 and a transmitting region 137 are formed on a surface of the optical path separator 135 which is disposed in a position such that the reflective region 136 reflect the light beam from the light source. The optical path separator 135 includes a transparent plate having two parallel surfaces, and is disposed obliquely to the optical axis of the light beam. A reflective surface is formed on the reflective region 136 of the optical path separator 135, as shown in FIG. 3B, and the rest of the surface of the optical path separator 135 corresponds to the transmitting region 137.

The photodetector unit 41 is disposed in the optical path of the separated returning light beam so as to detect the returning light.

As a birefringent holographic diffraction grating of the diffraction component 51, the birefringent holographic diffraction grating as explained with reference to FIG. 1D may be used. Further, the detector as shown in FIG. 1E may be used in a photodetector unit 41. In this case, however, the birefringent holographic diffraction grating is not required to have an additional convergence function as a positive lens, because the photodetector unit 41 may be disposed in a position corresponding to the conversion point of the returning light beam through the collimator lens 23.

In the embodiment as illustrated in FIG. 3A, the returning light beam through the transparent plate having two parallel surfaces is imposed on astigmatism, because the returning light beam is transmitted through the transparent portion of transparent plate that is disposed obliquely. In this case, this astigmatism may be used for the astigmatism-method for detecting focusing-error signals. If the above-mentioned astigmatism is not sufficient for generating the focusing-error signals, the holographic diffraction component may have an additional holographic function which enhances the astigmatism of the transparent plate. Alternatively, the holographic diffraction component may have the reverse additional holographic function which cancels the astigmatism of the transparent plate, if another method for detecting focusing-error signals is employed.

Figure 3C:
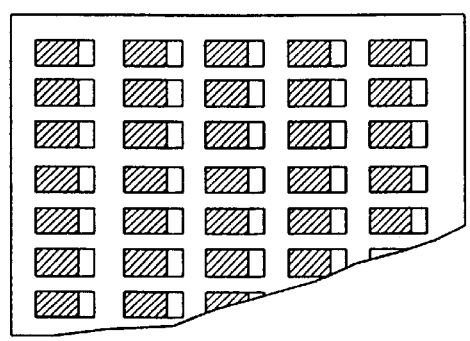
FIG. 3C is a schematic view illustrating a substrate which may be employed in a fabrication method of the optical path separator of FIG. 3A.

The dimension of the optical path separator 135 is in the order of 3 mm×5 mm utmost, for example; and a mass productive process for manufacturing the optical path separator can be utilized with ease using a patterning method for producing pieces of optical path separators 135 from a transparent substrate having a large area, as shown in FIG. 3C.

The position where the returning light beam converges does not shift even if the optical path separator 135 shifts to a certain extent, unless the surface-direction is changed. This is because the distance of the light-transmission is unchanged by the positional shift of the optical path separator 135. In contrast, the above described optical path separator 131 employed in the optical pick-up device of FIG. 2A should be disposed within prescribed accuracy in order to avoid problems related to the positional shift.

In another embodiment, a light beam emitted from a light source may be transmitted through a transparent surface of an optical path separator, and a diffracted returning light beam may be reflected by a reflective surface of the optical path separator. In this case, the light beam incident on the optical recording medium is also imposed on the astigmatism. Therefore, this astigmatism on the recording surface may preferably be canceled using an optical means.

Figure 4A:
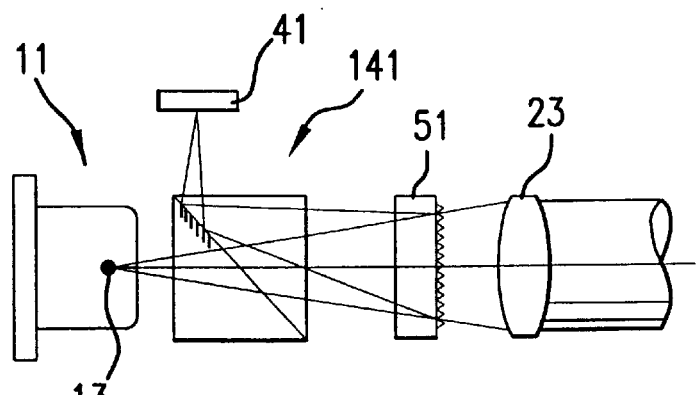
FIG. 4A illustrates a portion of an optical pick-up device according to still another embodiment of the present invention.

FIG. 4A illustrates a portion of an optical pick-up device according to yet another embodiment of the present invention. This embodiment is further explained with reference to FIGS. 4A and 4B. The optical pick-up device according to this embodiment, includes a semiconductor laser light source 11, a diffraction component 51, a photodetector unit 41, a collimator lens 23, an optical path separator 141 for separating an optical path of the returning light beam from that of a light beam emitted from the light source. A portion of the optical system between an optical recording medium and the collimator lens 23 is similar to that of the embodiment as shown in FIG. 1A. The optical pick-up device, as shown in FIG. 4A, records information on an optical recording medium by irradiating a recording surface of the optical recording medium with a light beam from the semiconductor laser light source 11 through the diffraction component 51, and reads information by irradiating the photodetector unit 41 with a diffracted returning light beam through the diffraction component 51.

In this embodiment, the diffraction component is a birefringent holographic diffraction component having a diffractive function dependent on the polarization of transmitted light.

Figure 4B:
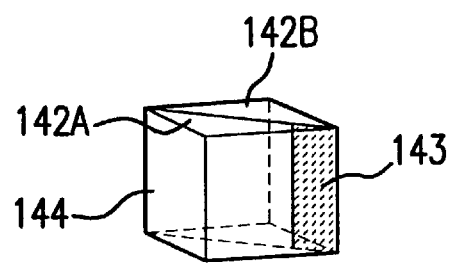
FIG. 4B is a schematic view illustrating the optical path separator of FIG. 4A.

As shown in FIG. 4B, the optical path separator 141 is a cubic type prism component having two right-angle prisms 142A and 142B whose oblique surfaces are adhered to each other. Further, a reflective surface 143 is formed on a portion of the adhered surface. The rest of the adhered surface corresponds to a transparent surface 144.

In the embodiment as shown in FIG. 4A, a light beam emitted by the semiconductor laser light source 11 is transmitted through the optical path separator 141. Namely, respective positions of the semiconductor laser light source 11 and the photodetector unit 41 are approximately interchanged, in contrast to those of FIG. 3A. According to this arrangement for the semiconductor laser light source 11 and the photodetector unit 41, width of the optical pick-up device becomes generally smaller than that of the optical pick-up device of FIG. 2A or 3A, where the width of the optical pick-up device, in this case, corresponds to the vertical direction of each figure. Thereby an optical pickup device suitable for a notebook-type computer is provided, because a width of a seek-rail thereof can be designed to be narrow. Further, because the cubic prism component, in which oblique surfaces of the two right angle prisms are adhered each other, generates little aberration on the transmitted light, the diffraction component 51 need not have the aforementioned additional holographic function to cancel the aberration. Thereby the birefringent holographic diffraction component may include a conventional grating having a simple lattice structure. In this case, production cost of the diffraction component 51 is low, and stability of the diffractive function is high.

Figure 5:
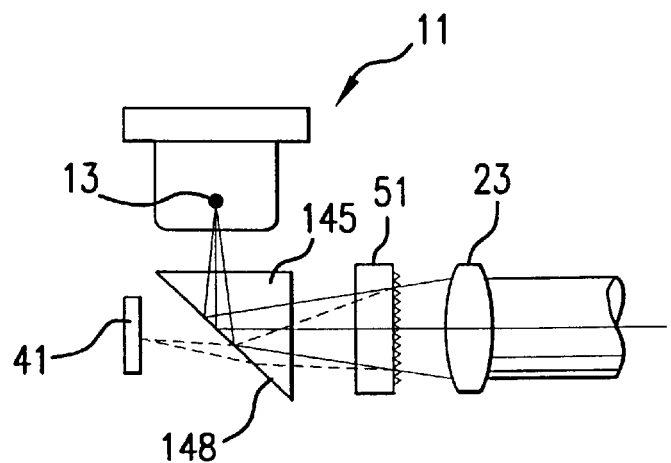
FIG. 5 illustrates a portion of an optical pick-up device according to still another embodiment of the present invention.

FIG. 5 illustrates a portion of an optical pick-up device according to yet another embodiment of the present invention. The optical pick-up device includes a semiconductor laser light source 11, a diffraction component 51, a photodetector unit 41, a collimator lens 23, an optical path separator 145 for separating an optical path of the returning light beam from that of a light beam emitted from the light source. A portion of the optical system between an optical recording medium and the collimator lens 23 is similar to that of the embodiment as shown in FIG. 1A. The optical pick-up device, as shown in FIG. 5, records information on an optical recording medium by irradiating a recording surface of the optical recording medium with a light beam from the semiconductor laser light source 11 through the diffraction component 51, and reads information by irradiating the photodetector unit 41 with a diffracted returning light beam through the diffraction component 51.

In this embodiment, the diffraction component 51 is a birefringent holographic diffraction component having a diffractive function dependent on the polarization of transmitted light.

The optical path separator 145 is a prism, and an internal reflection at its oblique surface 148 is utilized for separating optical paths of the light beam from that of the returning light beam. Namely, only one of these light beames is reflected by the total internal reflection of the oblique surface 148, according to the difference in incident angle. There are no reflective films formed on the oblique surface 148, because the reflective region correspond to a region where the light is incident on the region with an incident angle such that the total internal reflection of the light takes place.

In the embodiment as shown in FIG. 5, the light beam emitted from the semiconductor laser light source 11 is incident onto the oblique surface 148 with an incident angle of 45 degrees, with respect to the major propagation direction. When a refractive index of the optical path separator 145 is 1.6, for example, an equation: 1.6 sin(45°)=1.13 (>1), stands. Thereby a condition for total internal reflection is satisfied. This condition is satisfied even when the divergence of the light beam is taken into account. Therefore, the whole light beam is reflected by total internal reflection. Further, when a diffraction angle of the diffraction component 51 is 10 degrees, for example, the returning light beam that is diffracted by the diffraction component 51 is incident onto the oblique surface 148 with an incident angle of 35 (=45−10) degrees, with respect to the major propagation direction. In this case, an equation: 1.6 sin(35°)=0.92 (<1), stands. Thereby the diffracted returning light is transmitted through the optical path separator 145. The condition is also satisfied even when divergence of the diffracted returning light beam is taken into account.

Therefore, the reflective region of the optical path separator 145 can be provided without forming any reflective films. Further, as shown in FIG. 5, the reflective region and the transmitting region partly overlap each other on the oblique surface 148 of the optical path separator 145. Thereby, the optical path separator 145 itself can be miniaturized. Furthermore, the optical pick-up device can employ a low-cost birefringent holographic diffraction component having a small pitch of grating. Accordingly, costs are further reduced.

Figure 6:
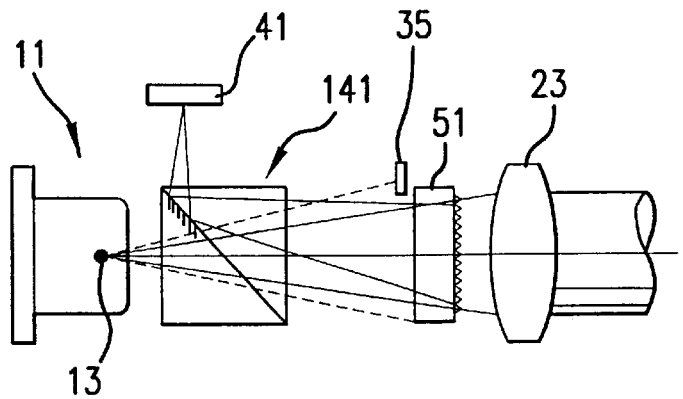
FIG. 6 illustrates a portion of an optical pick-up device according to still another embodiment of the present invention.

FIG. 6 illustrates a portion of an optical pick-up device according to yet another embodiment of the present invention. This embodiment is a variation of the above-explained optical pick-up device of FIG. 4A, which is capable of monitoring a power of light. A portion of the optical system between an optical recording medium and the diffraction component 51 is similar to that of the embodiment as shown in FIG. 1A.

In general, the light beam emitted from the light source is preferably controlled to be within a prescribed power range for a stable operation of optical pick-up device. Therefore, intensity of light-emission is optionally monitored by detecting a portion of the emitted light beam emitted from the light source. According to the embodiment as shown in FIG. 6, a monitoring detector 35 for monitoring a power of light is disposed between the diffraction component 51 and the optical path separator 141. The monitoring detector 35 is necessary to be arranged with high accuracy so that the monitoring detector 35 can reliably detect the portion of the light beam from the semiconductor laser light source 11, and may not shield the returning light. Therefore, assembly of the monitoring detector 35 is slightly difficult.

Figure 7A:
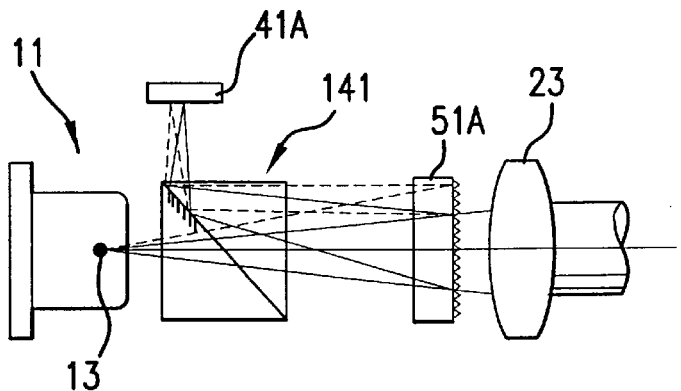
FIG. 7A illustrates a portion of an optical pick-up device according to still another embodiment of the present invention.
Figure 7B:
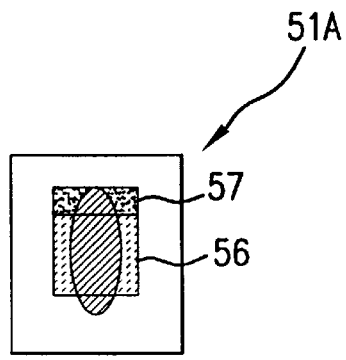
FIG. 7B is a schematic view illustrating the diffraction component of FIG. 7A.

FIG. 7A illustrates a portion of an optical pick-up device according to yet another embodiment of the present invention. This embodiment is another variation of the above-explained optical pick-up device of FIG. 4A, which is capable of monitoring a power of light. A diffraction component 51A, as shown in FIG. 7B, is employed in this embodiment. A reflective holographic grating 57 for reflecting a portion of a light beam emitted from a semiconductor laser light source 11 is further formed on the diffraction component 51A, in order to provide a monitoring light beam. The reflective holographic grating 57 is disposed adjacent to a birefringent holographic grating 56 for diffracting the returning light beam. The reflective holographic grating 57 reflects a peripheral divergent light beam emitted from the semiconductor laser light source 11, which is a portion not used for irradiation on the optical recording medium. The light beam reflected by the reflective holographic grating 57 is further reflected by a reflective region of the optical path separator 141, and is incident onto a photodetector unit 41A. The reflective holographic grating 57 also has a converging function as a lens for convergence of the reflected, light beam on the photodetector unit 41A. The photodetector unit 41A further includes a monitoring detector for detecting the monitoring light beam reflected by the reflective holographic grating 57, as well as the detector for detecting the returning light beam.

According to this embodiment, because the reflective holographic grating 57 and the birefringent holographic grating 56 are integrated on the diffraction component 51A with an accurate arrangement, positional adjustment between them is not required, provided that the diffraction component 51A is correctly disposed in a prescribed position. Thereby the optical pick-up device can be assembled with ease. Further, the monitoring detector for monitoring the light beam and the detector for the returning light beam may be integrated in the photodetector unit 41A. Further, when a large amount of monitoring light is required, such a reflective holographic diffraction component may be formed in the whole peripheral region.

Figure 8:
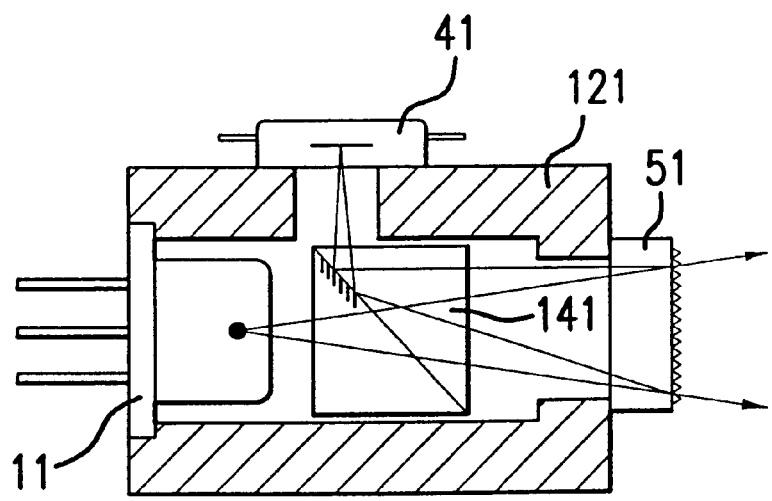
FIG. 8 illustrates a portion of an optical pick-up device according to still another embodiment of the present invention.

FIG. 8 illustrates a portion of an optical pick-up device according to yet another embodiment of the present invention. The optical pick-up device includes a semiconductor laser light source 11, a diffraction component 51, a photodetector unit 41 having a detector, a chassis 121, and an optical path separator 141 for separating an optical path of the returning light beam from that of a light beam emitted from the light source. A portion of the optical system between an optical recording medium and the diffraction component 51 is similar to that of the embodiment as shown in FIG. 1A. The semiconductor laser light source 11, the diffraction component 51, the photodetector unit 41, and the optical path separator 141 are arranged in respective positions of the chassis 121.

Miniaturization of the optical pick-up device is achieved by integrating the semiconductor laser light source 11, the diffraction component 51, the photodetector unit 41, and the optical path separator 141 into the integrated cell-structure. Further, the optical components are effectively prevented from a relative positional error. In addition, an assembly of the optical pick-up device is facilitated because each optical component may be independently manufactured or assembled, and may be integrated. Thereby modifications by substituting one or more optical components to the other improved optical components, such as a substitution to a semiconductor laser capable of outputting a high power beam or to a detector having high sensitivity.

In the embodiment as shown in FIG. 8, the light source, the diffraction grating, the optical path separator, and the photodetector unit are assembled to be integrated in the chassis. Specifically, optical components of any above-explained embodiment may be integrated in a chassis. For example, as to the integration of the optical pick-up device of FIG. 1A, the semiconductor laser light source 11, the diffraction component 51, the photodetector unit 31 having the detector and the light transmitting portion 37 which is disposed of opposite the light-emitting portion 13 of the semiconductor laser light source 11, may be assembled to be integrated in respective positions of a chassis.

In each of the embodiments as illustrated in FIGS. 4A–8A, positions of the light source and the photodetector unit may be approximately interchanged. For example, as an alternative to the embodiment of FIG. 5, the light beam emitted from the light source may be transmitted through the transparent region of the optical path separator, and reaches the diffraction component 51. In this case, the returning light beam diffracted by the diffraction component 51 is reflected by the optical path separator. In this embodiment, arrangement of respective optical components is slightly optimized, in order to achieve a suitable operation.

In each of the embodiments as illustrated in FIGS. 1A–8A, the diffraction grating is disposed between the light source and the collimator lens. Specifically, the position of the diffraction grating is not restricted to such a position. For example, the diffraction grating may be disposed in any appropriate position between the collimator lens and the quarter-wave plate.

As mentioned above, when the birefringent crystal such as lithium niobate is used for the birefringent diffraction grating, the light, as far as it is divergent, is imposed on aberration due to anisotropy of refractive index. When such a diffraction grating having a birefringent crystal is employed, the diffraction grating is preferably disposed in an optical path of the parallel light beam.

In any case, the birefringent holographic diffraction component having such a birefringent crystal is expensive, and increases costs.

As an alternative to such an expensive birefringent crystal, an anisotropic film made of an organic material or an inorganic material may be employed in the birefringent holographic grating in the embodiments according to the present invention, for reducing costs or suppressing aberration.

The inorganic birefringent film may be formed using a so-called oblique disposition method.

Figure 9:
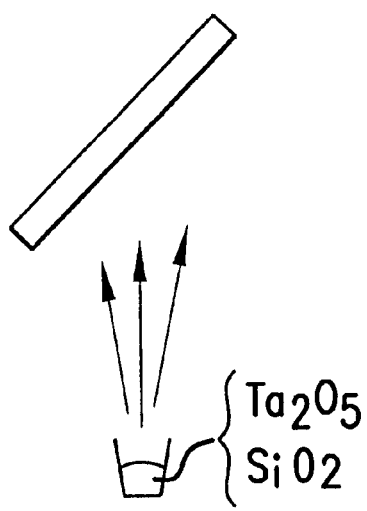
FIG. 9 is a schematic view illustrating an oblique deposition method.

For example, a method is disclosed in the Japanese publication, Journal of Surface Finishing Society of Japan, Vol. 46, No. 7, p32(1995). An anisotopic film having birefringence $\Delta n$ of about 0.08 is obtained by depositing a dielectric material such as $LiNbO_3$ or $CaCO_3$ on a substrate by the oblique disposition method as illustrated in FIG. 9, where the birefringence $\Delta n = n_p - n_s$ is defined by the difference between refractive indexes of P-polarized light ($n_p$) and S-polarized light ($n_s$). This value is equivalent to that of the LiNbO3 crystal. Further, because this film can be deposited on a substrate having a large deposition area by the conventional disposition method, reduction of the production cost is achieved. In addition, because a thickness of the deposited film is very small, for example, in the order of 10 $\mu$m, in contrast with the $LiNbO_3$ crystal substrate having a thickness of about 500–1000 $\mu$m, generation of aberration is suppressed considerably, even when it is disposed in an optical path of divergent light.

Another method is known for forming a birefringent anisotopic film using an organic highly oriented film. The method is disclosed in the publication, Journal of Applied Physics, Vol. 72, No. 3, p938 (1992).

As an under-layer, an oriented film such as a SiO film, which is deposited on a transparent substrate such as a glass substrate using an oblique deposition method, or an oriented polyethylene terephtalate (PET) film, which is treated by a rubbing using a cloth, is employed. Diacetylene monomer is deposited in an oriented state on the under-layer by a vacuum evaporation method. The oriented diacetylene monomer film is then polymerized to form a birefringent anisotopic film by the irradiation of ultraviolet light. This vacuum evaporation method can also produce an organic low-cost anisotopic film.

Still another method for producing a birefringent anisotopic film is disclosed in the Japanese publication, TECHNICAL REPORT OF IEICE, EDM94-39, CPM94-53, OPE94-48 (1994-08), issued by the Institute of Electronics, Information and Communication Engineers. Namely, a polyimide molecular chain is oriented uniaxially by the drawing of a polyimide film that is fabricated by a method such as a spin-coat method; thereby the birefringence is induced in the polyimide film with respect to a direction of the film plain. According to this method, the birefringence $\Delta n$ can be varied by varying a manufacturing condition of temperature or a value of force imposed on during the drawing process. This provides a mass productive low-cost method.

Accordingly, a birefringent holographic diffraction component is fabricated by, for example, (1) depositing the above-mentioned birefringent film on a substrate such as a quartz-glass substrate, (2) cutting the substrate into pieces having a prescribed dimension, (3) forming a holographic pattern of concave or convex surface on respective pieces of the substrate using an anisotropic etching method, etc., and (4) coating over the holographic pattern with an isotropic material for forming a flat surface of the isotropic material over the holographic pattern.

Figure 10A:
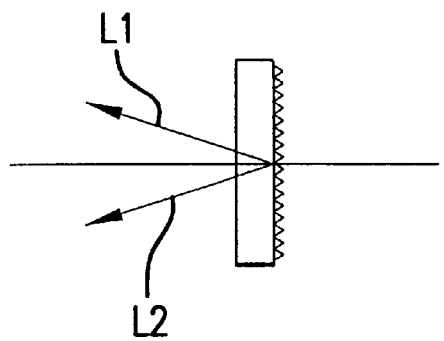
FIG. 10A is a schematic view illustrating a non-blazed diffraction grating.

In the above-detailed embodiments, the returning light beam is diffracted by the birefringent holographic diffraction component, and is incident onto the detector. To be more precise, the diffracted returning light includes the fractions of light corresponding to +1st order diffracted returning light and −1st order diffracted returning light, as shown in FIG. 10A. However, only a +1st order diffracted returning light reaches the detector in the above-explained embodiments. Intensity of the +1st order diffracted returning light is equal to that of the −1st order diffracted returning light, when a symmetrical diffraction grating is used. Therefore, only a half of the diffracted returning light is detected by the detector in embodiments using such a symmetrical diffraction grating, and the other half is lost.

Figure 10B:
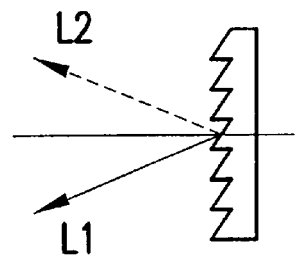
FIG. 10B is schematic views illustrating a blazed diffraction grating.
Figure 10C:
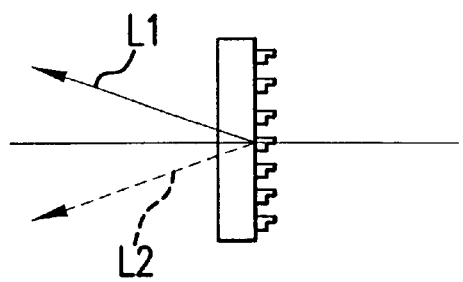
FIG. 10C is a schematic view illustrating another blazed diffraction grating having a step-like cross sectional structure.
Figure 10D:
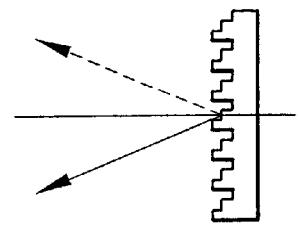
FIG. 10D is a schematic view illustrating yet another blazed grating having a step-like cross sectional structure.

In contrast, when a blazed holographic diffraction component is employed, the diffracted returning light beam can be utilized more efficiently. Namely, as shown in FIG. 10B, a blazed grating may be used as the diffraction grating. Alternatively, another blazed grating having a step-like cross sectional structure may be used, as shown in FIG. 10C or 10D.

In such a blazed grating, the cross-sectional features with respect to a cross-section of the diffraction component become asymmetrical. Accordingly, intensity of the +1st order diffracted returning light L1 is more intense than that of the −1st order diffracted returning light L2, and the optical pick-up device can utilize the diffracted returning light beam efficiently by placing the detector in the position suitable for detecting the intensified +1st order diffracted returning light. The S/N ratio is thereby increased, and reliability is increased. In addition, an excellent signal detecting operation can be achieved even for an optical recording medium driven with a high angular velocity.

Figure 11:
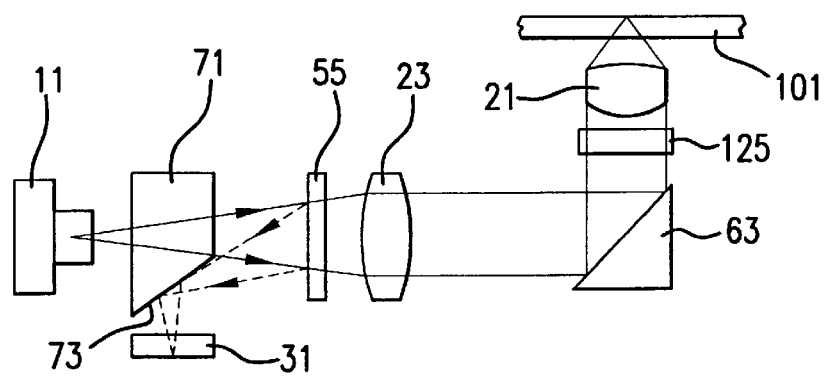
FIG. 11 illustrates an optical pick-up device according to still another embodiment of the present invention.

FIG. 11 illustrates an optical pick-up device according to still another embodiment disclosed herein.

The optical pick-up device includes a semiconductor laser light source 11, a prism 71 as an optical member, a birefringent holographic grating 55 on a diffraction component, a collimator lens 23, a upward-reflection mirror 63, a quarter-wave plate 125, an objective lens 21, and a photodetector unit 31 having a plurality of detectors. In this embodiment, the prism 71, which has a transparent body formed in a shape of a square pole or a trapezoid-pole, is employed. A reflective prism-surface 73 as a reflective optical surface is formed on an oblique surface of the prism 71 at one end. In FIG. 11, an optical disk 101 as an optical recording medium is also illustrated.

In FIG. 11, a light beam emitted from the semiconductor laser light source 11 is transmitted through the prism 71 and the birefringent holographic diffraction component; 55, and is refracted by the collimator lens 23 to become a parallel light beam. The parallel light beam becomes a circularly polarized light when passing through the quarter-wave plate 125. Then, the light beam which has been transmitted through the objective lens 21 converges on a recording surface of the optical disk 101, in a form of a micro light spot, and is reflected by the recording surface. The returning light beam, which is thus reflected by the recording surface of the optical disk 101, returns to the collimator lens 23 again via the objective lens 21 and the quarter-wave plate 125, in a form of linearly polarized light having a plane of polarization rotated by 90 degrees from that of the light as emitted from the semiconductor laser light source 11. The returning light begins to converge when it is transmitted through the collimator lens 23, is diffracted by the birefringent holographic diffraction component 55, is reflected by the reflective prism-surface 73, and is incident onto the photodetector unit 31. Thereby information signals, focusing-error signals, and tracking-error signals are detected.

Figure 12:
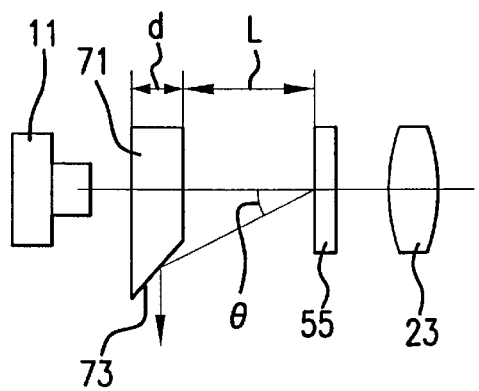
FIG. 12 illustrates a portion of the optical pick-up device of FIG. 11.

In this embodiment according to the present invention, the prism 71 reflects the diffracted returning light from the birefringent holographic diffraction component 55 toward the photodetector unit 31, and is disposed so that the transmitting body between two parallel surfaces is set in the optical path between the semiconductor laser light source 11 and the birefringent holographic diffraction component 55. For the embodiment as shown in FIG. 12, we let n and d denote refractive index and thickness of the prism 71, respectively, then, the length of optical path in the prism 71, through which the light is transmitted, becomes d/n. In this case, the interval between the semiconductor laser light source 11 and the collimator lens 23 is increased by (d−d/n) from that in the case without the prism 71, thereby the interval between the birefringent holographic diffraction component 55 and the reflective prism-surface 73 may be designed larger, to the extent corresponding the above-explained interval increased.

For example, when the prism 71 is made of BK7-glass having a refractive index of 1.5 and a thickness of 0.3, equations d/n=2.0 mm and (d−d/n)=1 mm stand. Therefore, the length of optical path of this portion may be shortened by 1 mm than in the case without the prism 71. Therefore, the space for another component is enlarged. Namely, in the optical pick-up device without the prism 71, it requires a space having an interval of 3 mm for disposing the reflective surface. In contrast, by disposing the prism 71 between the semiconductor laser light source 11 and the birefringent holographic diffraction component 55, it has equivalent effect as the case which requires reduced space of only 2 mm for disposing the reflective mirror. Thereby the interval L between the birefringent holographic diffraction component 55 and the reflective prism-surface 73 can be increased, and the birefringent holographic diffraction component 55 having small separation angle θ may be employed in an optical pickup device for recording an optical recording medium. Therefore, deterioration of separation properties of the birefringent holographic diffraction component 55 for polarized light is suppressed, which generally arises when the birefringent holographic diffraction component 55 has a small pitch, or a large separation angle.

Figure 13:
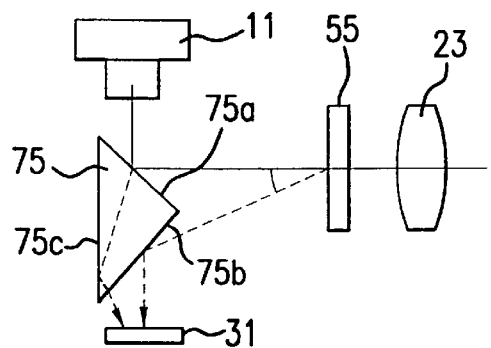
FIG. 13 illustrates a portion of an optical pick-up device according to still another embodiment of the present invention.

FIG. 13 illustrates a portion of an optical pick-up device according to still another embodiment of the present invention. An exemplary optical system including a portion between the light source and the collimator lens or between the collimator lens and the photodetector unit is illustrated. In this embodiment, a trigonal prism 75 is employed as the prism-like optical member. The trigobal prism has a first optical surface 75a, a second optical surface 75b, and a third optical surface 75c. The other potions are similar to those of FIG. 1A.

In FIG. 13, light emitted from the semiconductor laser light source 11 is reflected by the first optical surface 75a of the trigonal prism 75, is transmitted by the birefringent holographic diffraction component 55, and becomes parallel light when being transmitted by the collimator lens 23. After that, similar to the embodiment of FIG. 11, the light is focused on the recording surface of the optical disk. The returning light, which is reflected by the recording surface, returns to the birefringent holographic diffraction component 55 through the collimator lens 23, is diffracted by the birefringent holographic diffraction component 55, is reflected by the second optical surface 75b of the trigonal prism 75, and is incident onto the photodetector unit 31 having a detector for detecting information signals and a monitoring detector for monitoring a power of light, thereby information signals, focusing-error signals, and tracking error signals are detected.

According to this embodiment, the photodetector unit 31 can simultaneously detect the power of light beam emitted from the semiconductor laser light source 11, as well as the information signals. Namely, the light emitted by the semiconductor laser light source 11 is not perfectly reflected by the first optical surface 75a, but is slightly transmitted by the first optical surface 75a. Thereby, a portion of the light emitted by the semiconductor laser light source 11 passes through the first optical surface 75a, is reflected by the third optical surface 75c, is transmitted by the second optical surface 75b, and is incident on the photodetector unit 31.

In this embodiment, for example, the second optical surface 75b may be constituted of polarized beam splitter, which reflects S-polarized light and transmits P-polarized light. Because the light diffracted by the birefringent holographic diffraction component 55 is S-polarized light and the light passes inside the trigonal prism 75 is P-polarized light, the light diffracted by the birefringent holographic diffraction component 55 is reflected by the second optical surface 75b toward the photodetector unit 31, and the monitoring light which passes inside the trigonal prism 75 is transmitted by the second optical surface 75b, and reaches the photodetector unit 31.

FIG. 14A illustrates a portion of an optical pick-up device according to still another embodiment of the present invention. In this embodiment, the reflective prism-surface 73 of FIG. 11, which reflects the diffracted returning light, is substituted to a reflective diffraction grating 73', for example, as shown in FIG. 14A. The light from the birefringent holographic diffraction component 55 is divided into three beams of 0th order light and ±1st-order light. As shown in FIG. 14A, the +1st order beam images at a pre-focus point before the surface of the photodetector unit 31, and the −1st order beam images at a rear-focus point after the surface of the photodetector unit 31. When the photodetector unit 31 has respective 3-division photodetectors 31a, 31b, and 31c for detecting the +1st order beam, the −1st order beam, and the 0th order beam, focusing-error signals may be detected by the beam-size method. In this case, the 3-division photodetector 31c detects the 0th order beam.

According to the above-described constitutions of the reflective diffraction grating 73', the birefringent holographic diffraction component 55 is not required to be divided into complicated divided patterns. In addition, adjustment in assembling process is facilitated in this case.

Further, because the spot size of the 0th order diffracted returning light on the photodetector unit 31 is small when the 0th order diffracted returning light from the reflective diffraction grating 73' is used for information signals detection only, the 3-division photodetector 33c for detecting the 0th order diffracted returning light can be designed to be small. Therefore, when the 3-division photodetector 33c further includes a high-speed amplifier, high-speed Rf signals having high quality are obtained, according to the above-described constitution suitable for high-speed signals.

Also, when the second optical surface 75b of the trigonal prism 75 in the embodiment as shown in FIG. 13 may be substituted to the refractive type diffraction grating. In this case, the similar effect is obtained.

FIG. 15 illustrates a portion of an optical pick-up device according to still another embodiment of the present invention. An example of the optical system, which include a portion between the light source and the collimator lens or a portion between the collimator lens and the photodetector unit, is illustrated. In this embodiment, a trigonal prism 76 having a first optical surface 76a, a total internal reflection surface 76b, and a third optical surface 76c is employed, and both of the signal light and the monitoring light are simultaneously detected by the photodetector unit 31. A portion between the collimator lens 23 and the optical recording medium is similar to that of the embodiment as shown in FIG. 13.

In FIG. 15, light emitted by the semiconductor laser light source 11 is reflected by the first optical surface 76a of the trigonal prism 76, is transmitted by the birefringent holographic diffraction component 55 and collimator lens 23, and becomes parallel light. After that, the light converges on the recording surface of the optical disk as in the case of the embodiment as illustrated in FIG. 11, and the reflected returning light returns to the birefringent holographic diffraction component 55 after being transmitted through the collimator lens 23. Then, the returning light is diffracted by the birefringent holographic diffraction component 55 to be incident onto the photodetector unit 31, thereby information signals, focusing-error signals, and tracking-error signals are detected.

In this embodiment, because the first optical surface 76a of the trigonal prism 76 is configured so as to transmit light slightly, a portion of the light emitted by the semiconductor laser light source 11 is transmitted through the first optical surface 76a, is reflected by the total internal reflection surface 76b, is transmitted through the third optical surface 76c to be projected outside the prism, and is incident onto the photodetector unit 31. Thereby, signal light and monitoring light can be detected using the photodetector unit 31. In contrast with the embodiment of FIG. 13, special optical surface such as polarized beam splitter surface of the second optical surface 75b of the trigonal prism 75, which reflects signal light and transmits monitoring light, is not required for this embodiment. Therefore, production of the triangle prism is facilitated, and the costs are reduced.

In embodiments, with the same context as explained with reference to FIGS. 10B–10D, a blazed diffraction grating may be used for the birefringent holographic diffraction component 55. This asymmetrical structure increases amount of the diffracted returning light that reaches the photodetector unit 31, thereby a S/N ratio of the signals is improved, or excellent signal detection is achieved for optical disk drives for driving optical recording medium with a high-speed rotation.

Figure 16:
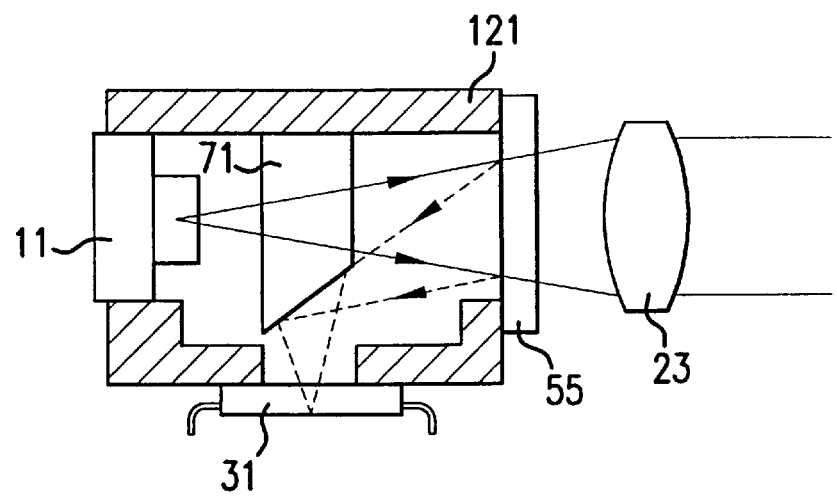
FIG. 16 illustrates a portion of an optical pick-up device according to still another embodiment of the present invention.

In the above mentioned embodiments, the semiconductor laser light source, the member, the birefringent holographic diffraction component 55, and the photodetector unit 31 may be integrated in one chassis to form a cell-structure. FIG. 16 illustrates a portion of an optical pick-up device, in which the semiconductor laser light source 11, the birefringent holographic diffraction component 55, the photodetector unit 31, and the prism-like optical member 71 having a reflective surface are housed at respective prescribed positions in the chassis 121. Such a cell-structure is advantageous in achieving as follows:

1. miniaturization;
2. stabilizing positional errors of respective components; and
3. facilitating assembly of the optical pick-up device.

In addition, both of reduction of costs and high reliability are achieved, because equivalent stability as the background hologram unit, which includes a mirror tube in which a laser diode light source and a photodetector unit are incorporated, is obtained.

Figure 17:
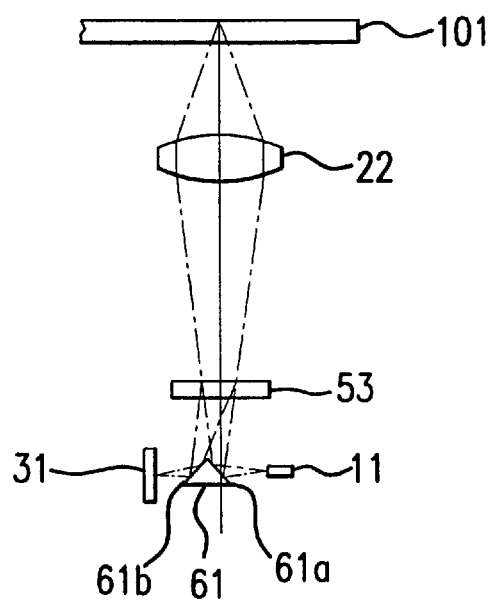
FIG. 17 illustrates an optical pick-up device according to still embodiment of the present invention.
Figure 22:
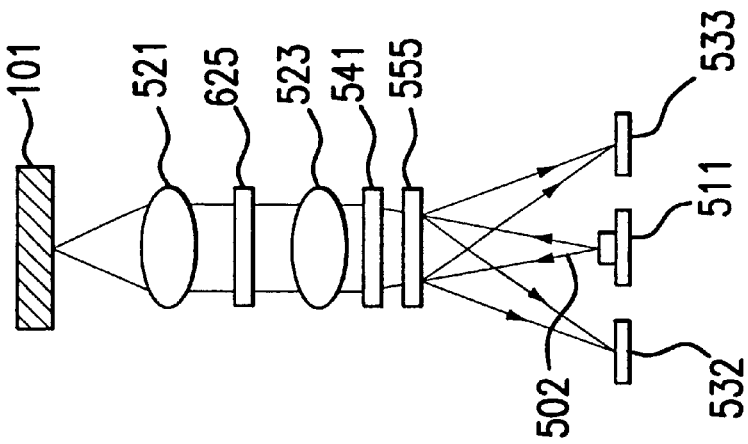
FIG. 22 illustrates another background optical pick-up device using a polarized holographic diffraction component.
Figure 21:
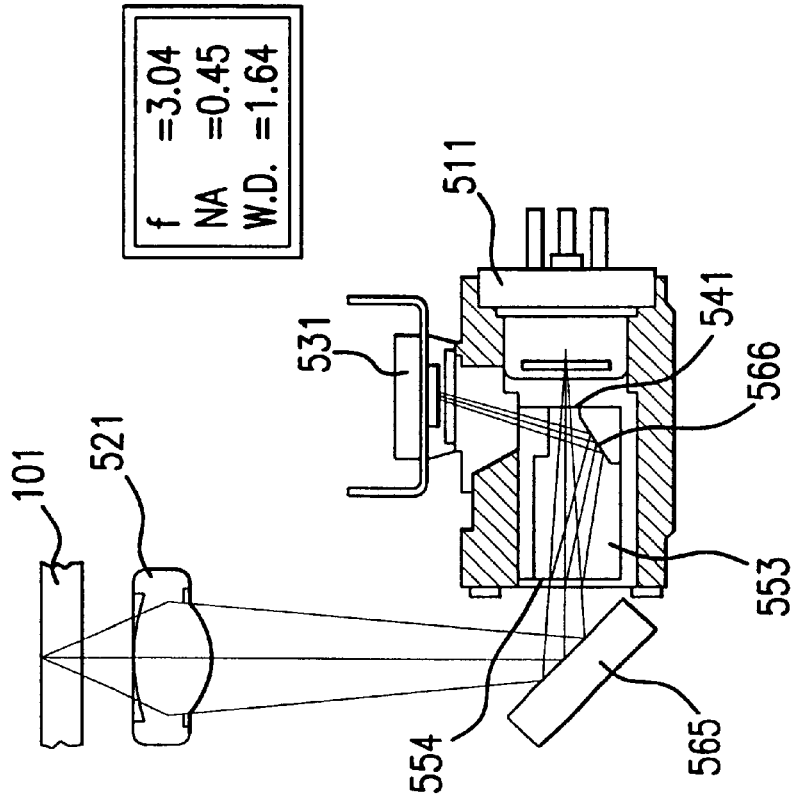
FIG. 21 illustrates a background optical pick-up device using a holographic diffraction component.

FIG. 17 illustrates an optical pick-up device according to still another embodiment of the present invention. The optical pick-up device includes a holographic diffraction component 53, a semiconductor laser light source 11, an objective lens 22, a photodetector unit 31, and a reflective member 61. In this embodiment, the reflective member 61 is provided among the semiconductor laser light source 11, holographic diffraction component 53, and photodetector unit 31. The reflective member 61 is, for example, isosceles-trigonal prism, which includes a first reflective surface 61a and a second reflective surface 61b. The first reflective surface 61a reflects a laser light beam emitted from the semiconductor laser light source 11 to the holographic diffraction component 53. The second reflective surface 61b reflects the returning light beam, which is diffracted by the holographic diffraction component 53. Thereby the diffracted returning light beam is separated from the light beam emitted from the laser light source 11, and reaches the photodetector unit 31.

According to the optical pick-up device having such a structure, even if the diffraction angle of the holographic diffraction component 53 is small, a marginal distance between the semiconductor laser light source 11 and the photodetector unit 31 is obtained by interposing the reflective member 61 in the optical path between the semiconductor laser light source 11 and the photodetector unit 31 or between the photodetector unit 31 and the holographic diffraction component 53. Therefore, the photodetector unit 31 can be disposed in a position such that the photodetector unit 31 is not hardly influenced by the effect of high-frequency from the semiconductor laser light source 11, because the semiconductor laser light source 11 and the photodetector unit 31 are not necessarily disposed closely. Further, because the semiconductor laser light source 11, the photodetector unit 31, and the reflective member 61 are no longer required to be packed together when they are manufactured/shipped, each optical component can be facilitated to be designed with high degrees of freedom, thereby the optical pick-up device itself can be designed with high degrees of freedom.

Further, because the light is reflected twice by the first reflective surface 61a and the second reflective surface 61b of the reflective member 61, the effect of rotary displacement of the reflective member 61 on the light, with respect to the incident side and the projected side, is canceled. Therefore, the optical system is not easily influenced by the rotary displacement. This is further explained with reference to FIGS. 18A and 18B. FIG. 18A illustrates respective propagation directions of the laser light in a normal state without the rotary displacement of the reflective member 61. Both of the light P from the semiconductor laser light source 11 to the first reflective surface 61a and the returning light S from the second reflective surface 61b to the photodetector unit 31 is directed in respective prescribed directions, for example, in the same direction as illustrated in FIG. 18A.

In contrast, FIG. 18B illustrates respective propagation directions of the laser light, when the reflective member 61 is rotated at an angle with the rotary displacement. In this case, the propagation direction of the reflected light q', which is reflected by the first reflective surface 61a, inclines by 2θ with respect to the direction of the original reflected light q. Further, the reflected light r' from the optical recording medium 101 is also inclined at an angle 2θ with respect to the direction of the original reflected light r. Therefore, the same angular relationship between the light P and the reflected light S is maintained, regardless of the existence of the rotary displacement of the reflective member 61. Namely, there arises no positional displacement of the beam-spot position on the photodetector unit 31. Thereby, errors in detecting focusing-error signals or tracking-error signals may not arise. Such a relationship is not restricted to the above-described embodiment, in which the reflective member 61 is an isosceles-trigonal prism, and in which the light P and the reflected light S are parallel.

Still another embodiment of the present invention is explained with reference to FIG. 19. The same reference numeral is used for each corresponding part to the embodiment as illustrated in FIG. 18A, and a further explanation on the corresponding parts is abbreviated. This embodiment further includes a monitoring detector 35 for detecting a portion of the emitted light beam P' from the semiconductor laser light source 11, which is not reflected by the first reflective surface 61a. The light beam P' is illustrated with slanted lines in the figure.

In order to record/reproduce information of the optical recording medium, it is necessary to operate with accurate output power of the light beam from the semiconductor laser light source 11. According to this embodiment, output power of the semiconductor laser light source 11 can be detected accurately without loss, by detecting the emitted light beam P' from the semiconductor laser light source 11, which is not reflected by the first reflective surface 61a and is not used for recording/reproducing. Thereby, a precise operation for recording/reading information is realized.

In this embodiment, the photodetector unit 31 and the monitoring detector 35 may be integrated on the same substrate 123, as shown in FIG. 20. Namely, the detector region for the photodetector unit 31 and the detector region for the monitoring detector 35 are formed on the substrate 123. Adoption of such a substrate 123 effectively reduces number of components, thereby a low-cost and compact optical pick-up device is provided. Further, according to the above-explained embodiments, a novel optical pick-up device is provided, which can detect an accurate power of the light emitted from the semiconductor laser for controlling the power thereof. Further, an optical pick-up device is provided, in which number of parts is reduced.

Obviously, numerous modifications and variations of the embodiments disclosed herein are possible in light of the above teachings. It is therefore to be understood that within the scope the appended claims, the invention may be practiced otherwise than as specifically described herein.

This document is based on Japanese Patent Application Nos. 10-176959/1998 filed in the Japanese Patent Office on Jun. 24, 1998, 10-189171/1998 filed in the Japanese Patent Office on Jul. 3, 1998, and 10-199176/1998 filed in the Japanese Patent Office on Jul. 14, 1998, the entire contents of which are hereby incorporated by reference.

What is claimed is:

1. An optical pick-up device for recording/reading information on an optical recording medium, comprising:

a light source for emitting a light beam;

an optical system having a converging function for the light beam, through which the light beam converges on a recording surface of the optical recording medium, and through which the returning light beam that is reflected by the recording surface is collected and converges to produce a convergent returning light beam;

a diffraction component for diffracting the convergent returning light beam that is reflected by the recording surface to produce a diffracted returning light beam;

an optical path separator for separating the diffracted returning light beam from the light beam that is emitted from the light source toward the optical path separator, including a transparent body having a surface with a reflective region and a transmitting region, the optical path separator being arranged such that the diffracted returning light beam is reflected by the reflective region without passing into the transparent body; and a photodetector unit having a detector for detecting the diffracted returning light beam, and being disposed in an optical path of the diffracted returning light beam so as to detect the diffracted returning light beam.

2. The optical pick-up device according to claim 1, further comprising a quarter-wave plate, wherein the diffraction component is a birefringent holographic diffraction component.

3. The optical pick-up device according to claim 2, wherein the transparent body is a prism-like element.

4. The optical pick-up device according to claim 2, wherein the reflective region is a surface disposed obliquely to the optical path of the returning light beam.

5. The optical pick-up device according to claim 4, wherein the photodetector unit detects focusing-error signals using an astigmatism focusing-error detecting method.

6. The optical pick-up device according to claim 5 wherein the diffraction component includes an additional holographic function that enhances an astigmatism.

7. The optical pick-up device according to claim 2, wherein the diffraction component includes an additional holographic function for canceling an astigmatism.

8. The optical pick-up device according to claim 2, wherein the reflective region is a prism-element.

9. The optical pick-up device according to claim 2, wherein the optical path separator includes a prism, in which an external reflection on an oblique surface of the prism is utilized for a reflection of the reflective region.

10. The optical pick-up device according to claim 1, further comprising a monitoring detector for monitoring a power of the light beam emitted from the light source.

11. The optical pick-up device according to claim 10, further comprising a reflective holographic grating, which reflects a portion of the light beam emitted from the light source to provide a monitoring light beam, formed in a vicinity of the diffraction component.

12. The optical pick-up device according to claim 1, wherein the light source, the diffraction component, the photodetector unit, and the optical path separator are housed in a chassis, thereby an integrated body is formed.

13. The optical pick-up device according to claim 1, wherein the optical path separator is arranged such that the light beam emitted by the light source passes through the transparent body.

14. A method for recording and reading an optical recording medium comprising the steps of:
   emitting an incident light beam;
   passing the incident light beam to a transparent portion of an optic unit;
   passing the incident light beam from the transparent portion of the optical unit through a diffraction component;
   converging the incident light beam from the diffraction component on an optical recording medium;
   diffracting a converged returning light beam reflected from said optical recording medium into a diffracted light beam using the diffraction component to direct the diffracted light beam toward an externally reflective portion of the optical unit; and
   detecting said diffracted light beam.

15. The method for recording and reading an optical recording medium according to claim 14, further comprising the step of monitoring the incident light beam.

16. The method for recording and reading an optical recording medium according to claim 14, including the step of monitoring the diffracted light beam.

17. The method for recording and reading an optical recording medium according to claim 14, further comprising the step of separating the diffracted light beam using the optical unit.

18. The method for recording and reading an optical recording medium according to claim 17, wherein the step of separating includes
   reflecting the diffracted light beam; and
   transmitting the other of the diffracted light beam or the returning light beam.

19. A method for recording and reading an optical recording medium comprising the steps of:
   emitting an incident light beam;
   directing the incident light beam to an optical unit;
   passing the incident light beam from the optical unit through a diffracting component;
   converging the incident light beam from the diffracting component on an optical recording medium;
   diffracting a converged returning light beam reflected from said optical recording medium into a diffracted light beam;
   separating the diffracted light beam using an external surface of the optical unit; and
   detecting the diffracted light beam.

20. The method for recording and reading an optical recording medium according to claim 19, further comprising the step of monitoring the power of the diffracted light beam.

21. The method for recording and reading an optical recording medium according to claim 20, including the step of monitoring the diffracted light beam.

22. The method for recording and reading an optical recording medium according to claim 19, further comprising the step of monitoring the incident light beam.

23. The method for recording and reading an optical recording medium according to claim 19, wherein the step of separating includes using the optical unit for reflecting the diffracted light beam.

24. The method for recording and reading an optical recording medium according to claim 19, wherein the step of detecting includes the step of detecting focusing-error signals.

* * * * *